United States Patent [19]

Coleman

[11] 4,057,803
[45] Nov. 8, 1977

[54] ADAPTIVE DIRECTION OF ARRIVAL ANTENNAE SYSTEM

[75] Inventor: Ernest W. Coleman, Orlando, Fla.

[73] Assignee: The United States of America as represented by the Secretary of the Navy, Washington, D.C.

[21] Appl. No.: 674,716

[22] Filed: Apr. 8, 1976

[51] Int. Cl.$^2$ ............................ G01S 3/48; H01Q 3/26
[52] U.S. Cl. ........................... 343/113 R; 343/100 SA; 343/117 A
[58] Field of Search ......... 343/113 R, 117 A, 100 SA

[56] References Cited

U.S. PATENT DOCUMENTS

| 2,996,712 | 8/1961 | Richman | 343/113 R |
| 3,005,200 | 10/1961 | O'Meara | 343/113 R X |
| 3,510,871 | 5/1970 | Watanabe et al. | 343/100 SA X |
| 3,964,065 | 6/1976 | Roberts et al. | 343/100 SA X |

Primary Examiner—Maynard R. Wilbur
Assistant Examiner—Richard E. Berger
Attorney, Agent, or Firm—R. S. Sciascia; Henry Hansen; William J. Iseman

[57] ABSTRACT

A system for adaptively determining the direction of arrival (DOA) of a linearly polarized RF signal. Three antennae are positioned at fixed distances from one another in a right triangle configuration to receive the RF signal. The antennae are alternatingly switched into two orthogonally aligned pairs and each pair exhibits an antenna pattern null which is adaptively steered toward the RF signal by a computer program operatively connected to a variable phase shifter which selectively alters the phase of the received signal. An algorithm within the program calculates the direction of arrival of the signal relative to a selected one of the antenna pair axes.

10 Claims, 2 Drawing Figures

ADAPTIVE DIRECTION OF ARRIVAL ANTENNAE SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to apparatus for indicating the bearing of RF signals emanating from an unknown position and particularly to an antennae system which adaptively determines the direction of arrival of RF signals by selectively steering antenna pattern nulls toward the source of the signal.

Direction finding systems have been employed for some time to determine the direction of arrival of an RF signal having an unknown source position. One method and apparatus utilized in such a system is a large aperture single antenna which produces a narrow beam pattern. Rotating the antenna causes the beam pattern to rotate through space and the direction of arrival of the RF signal can be located within the angular width of the antenna beam. The requirement of a large aperture, however, limits the frequencies at which this technique can be used and, generally, a large, thin array antenna system having 10 or more elements is employed for low frequency reception at less than one GHz. By comparing the phase of the RF signal at each of the antenna elements, bearing information can thus be obtained. Because of the requirement for a physically large antenna system, a correspondingly large mounting platform is required. In the case of mobile platforms such as aircraft or land vehicles or in any situation where the size of the platform must be restricted, a large antenna system may not be efficiently employed. In the VHF frequency range, the antenna aperture required to produce accurate bearing information becomes unrealistically large for installation on most aircraft. One direction finding system used in locating sonobuoys requires the adaptation of a 10 element antenna array to a limited number of aircraft that are large enough to efficiently support such an array, but such a system cannot efficiently be adapted to smaller aircraft platforms such as helicopters.

SUMMARY OF THE INVENTION

Accordingly, it is an object of the present invention to calculate, in an efficient and novel fashion, the direction of arrival of an RF signal source emanating from an unknown position. Another object of the present invention is to provide an adaptive direction of arrival antennae system comprising three antennae arranged in a right triangle configuration and being spaced from one another by respective distances of less than one half wavelength. Yet another object of the invention is to permit the installation of adaptive DOA antennae on relatively small platforms. A further object of the present invention is to permit direct implementation of an adaptive DOA antenna system on air, land and water vehicles having relatively small sizes.

Briefly, these and other objects are accomplished by an adaptive direction of arrival antennae system that adaptively determines the direction of arrival or azimuth of a linearly polarized RF signal. Three antennae are positioned at fixed distances from one another in a right triangle configuration to receive the RF signal. The antennae are alternatingly switched into two orthogonally aligned pairs and each pair exhibits an antenna pattern null which is adaptively steered toward the direction of the RF signal by a computer program operatively connected to a variable phase shifter which selectively alters the phase of the received signal. Each of the orthogonally aligned pairs are sequentially processed under computer control to produce a respective antenna pattern angle indicative of the null exhibited by the RF signal source. An algorithm within the program calculates the direction of arrival of the RF signal by processing the respective null angles of each of the orthogonal antenna pairs.

For a better understanding of these and other aspects of the invention, reference may be made to the following detailed description taken in conjunction with the accompanying drawings.

DESCRIPTION OF THE PREFERRED EMBODIMENT

Figure 1:
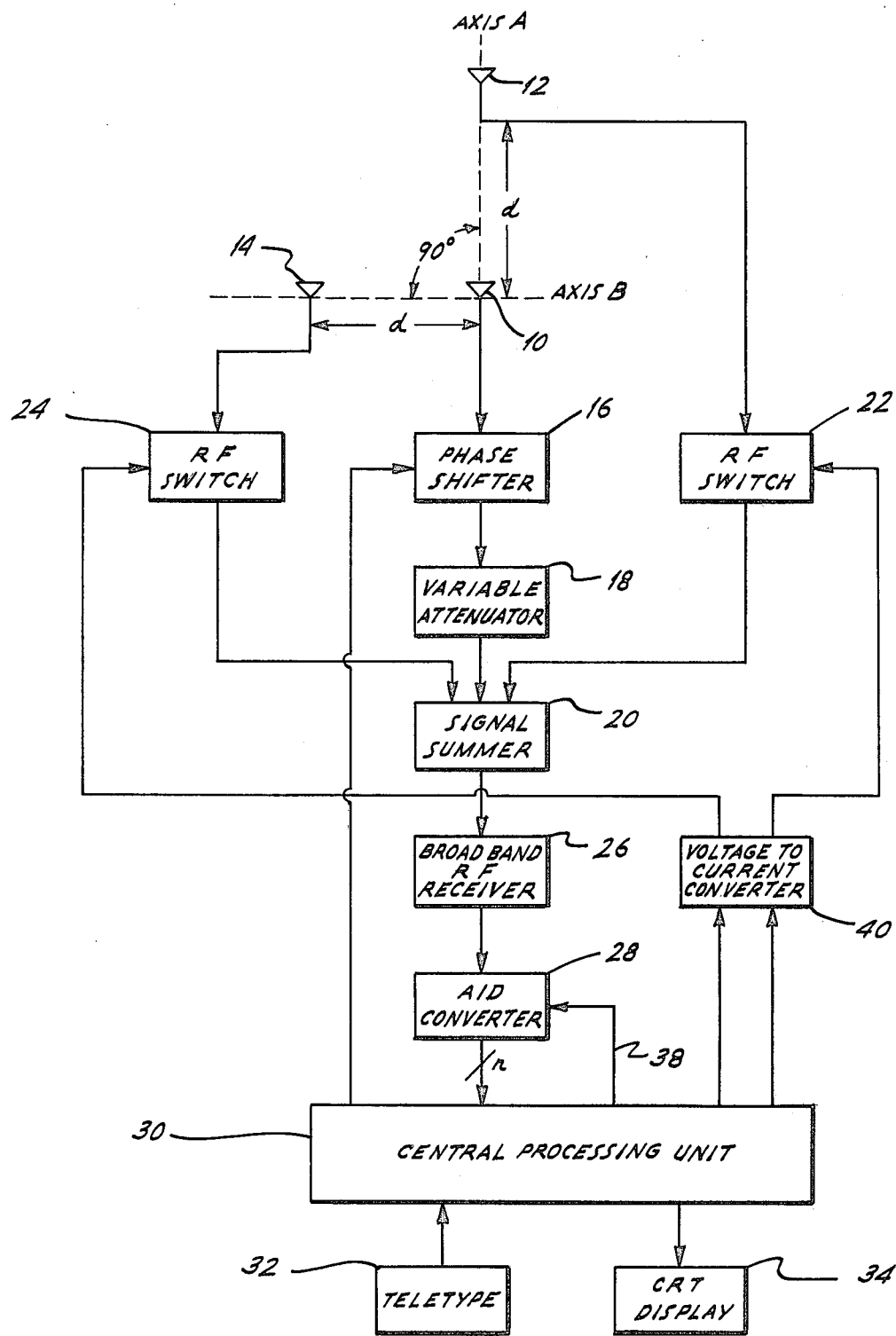
FIG. 1 is a block diagram of an adaptive direction of arrival antennae system according to the present invention.

Referring now to FIG. 1, there is shown a block diagram of an adaptive direction of arrival antennae system according to the present invention. Three antennae 10, 12, 14 are positioned in a right triangle configuration with antenna 10 being fixed at the apex of the right angle. Antennae 12 and 14 are each positioned respectively from antenna 10 at a distance $d$ used to indicate the spacing in wavelength of the respective antennae. Antennae 10 and 12 form a first axis A which is orthogonal to a second axis B formed between antennae 10 and 14. All of the antennae 10, 12, 14 lie in a common plane. In a typical application, the antennae are firmly positioned on a common platform such as the underbelly of an aircraft.

In the illustration of FIG. 1, the electric (E) field from antenna 10 is used as a reference in conjunction with either of the E fields from antennae 12 or 14. In the case where antennae 10 and 12 are selected for signal processing, the phase angle of antenna 10 may be measured from axis A and the E field from antenna 12 in the direction $\theta$ is advanced by $dr \cos \theta$. The vector sum of the E fields from antennae 10 and 12 is given by equation (1).

$$E = E_o + E_o e^{j\gamma} \tag{1}$$

By a trigonometric identity, equation (1) may be rewritten as:

$$E = 2E_o e^{j\gamma/2} \cos \gamma/2 \tag{2}$$

wherein
$\gamma = dr \cos \theta + \psi$
$dr = 2\pi d/\lambda$
$d$ = distance between antennae
$\lambda$ = wavelength
$\theta$ = phase angle of antenna
$\psi$ = phase shifter angle Normalizing equation (2) to its maximum value of unity by setting $2E_o = 1$ and the spacing between the antennae = $\frac{1}{4} \lambda$ yields:

$$E = e^{j\gamma/2} \cos \frac{\frac{\pi}{2} \cos\theta + \psi}{2} \qquad (3)$$

The magnitude of the total field is given by:

$$E = \cos \frac{\frac{\pi}{2} \cos\theta + \psi}{2} \qquad (4)$$

Solving for $\theta$ when E is equal to zero yields:

$$\theta = \cos^{-1} \frac{180 - \psi}{90} \qquad (5)$$

Using antennae 10 and 12, the field is zero at an angle $\theta$ when the phase shifter angle is equal to $\psi_1$. Similarly, using antennae 10 and 14, the field is zero at an angle $\theta_2$ when the phase shifter angle is equal to $\psi_2$. The DOA angle $\alpha$ is calculated from the following equation:

$$\alpha = \tan^{-1} \frac{\cos \theta_1}{\cos \theta_2} \qquad (6)$$

Thus when the field is equal to zero, the DOA angle can be determined. The present invention utilizes a method and structure designed to produce a signal output of the total received energy of an RF signal source along with corresponding phase shifter angles. From this output the phase shifter angle is chosen wherein the minimum of the total received energy occurred. The chosen phase shifter angle is then used in the calculation of the DOA angle using equation (6).

Referring again to FIG. 1, antenna 10 is connected to the signal input of a variable phase shifter 16 which provides an output signal to a variable attenuator 18. The output of the attenuator 18 is connected to one input of a signal summer 20. Antenna 12 is connected to the signal input of an RF switch 22 which provides a signal output to a second input of the summer 20. Similarly, antenna 14 is connected to the signal input of an RF switch 24 which provides a signal output to a third input of the summer 20. The summer 20 provides a single output which is connected to the input of a broadband RF receiver 26 whose output is connected to the signal input of an analog-to-digital (A/D) converter 28. The converter 28 provides a plurality of n signal output lines, one line for each of the output bits produced by the converter. A central processing unit 30 is connected to receive the n output lines from the converter 28 at a first series of inputs and is also connected to receive an input from a teletype 32. The processing unit 30 is connected to provide an output signal to a CRT display 34. The phase shifter 16 has a control input connected to receive a readout command pulse from the processing unit 30 over an output line 36. The unit 30 also provides a control signal to the control input of the converter 28 over an output line 38. Command switching signals are provided to respective control inputs of each of the RF switches 22, 24 by output signals from the processing unit 30 through a voltage to current converter 40 whose outputs are connected to the respective switch control inputs.

As earlier noted, an antenna pattern angle $\theta_1$ can be determined through the application of phase shifting techniques and algorithmical calculations to a series of two antenna elements placed along a common axis. Given a second set of antenna elements placed along an axis orthogonal to the axis of the first set of antenna elements, a new antenna pattern angle $\theta_2$ can be calculated with respect to the second set of antenna elements and a direction of angle $\alpha$ determined with respect to the position of an unknown RF signal source. Accordingly, antenna 10 is first utilized as the reference receiving element in conjunction with antenna 12 thereby defining the first axis A for a first pair of antenna elements. To this end, the converter 40 receives command output signals from the processing unit 30 such that simultaneous output signals are provided from the converter 40 to the respective control inputs of the switches 22, 24 so as to close switch 22 and to open switch 24; the effect of which is that RF switch 22 passes incoming signals received at antenna 12 and RF switch 24 blocks incoming signals received by antenna 14. Phase shifter 16 receives incoming signals generated at antenna 10 and provides an output signal which is shifted in phase according to the command signal present on control line 36. The level of the control signal present on line 36 is calibrated with the shifter 16 so as to produce a predetermined amount of phase shift which varies accordingly. The central processing unit 30 is programmed, as will be shown with greater detail hereinafter, to provide all command, switching and algorithmic functions and resultant calculations in conjunction with the other structure of the invention. The output signal of the shifter 16 is fed to the input of the variable attenuator 18 so that the insertion loss of the phase shifter 16 may be comparably adjusted with the losses, respectively, of the switches 22 and 24 in order to normalize any signal level imbalances in the system. In the present embodiment, and for initial adjustment purposes, an RF signal source producing a predetermined level output is received along axis A by antennae 10 and 12 and the attenuator 18 is manually tuned, for example, to produce an output signal level that is comparable with the level produced at the output of the RF switch 22. Similarly, the same RF signal source is introduced to antennae 10 and 14 and the attenuator 18 is once again manually adjusted to reflect an output signal level comparable with the output signal level of RF switch 24. Ideally, of course, having once adjusted the attenuator 18 with switch 22, and assuming that switches 22 and 24 are identical or nearly so in operating characteristics, there should be no further adjustment needed of the attenuator 18. If such an adjustment is indicated, the attenuator 18 is adjusted to reflect a median setting between the differing output levels. Of course, if the phase shifter operating characteristics could be ideally matched to the characteristics of the switches 22, 24, the attenuator 18 may be eliminated. The signal summer 20 receives at its inputs the switched output from switch 22 and the output from attenuator 18 and sums the incoming RF signals in a conventional manner to produce a singular output. Because of the blockage present at switch 24 at this time, there is no signal input at the summer 20 so as to effect the summed output thereof. The broadband receiver 26 receives the summed output from the summer 20 and, in the preferred embodiment, produces a 1,000 Hz. output carrier which is AM modulated according to the strength of the received signal from the summer. The receiver 26 is designed to receive RF signals within the frequency band of interest generated by potential RF signal sources. The A/D converter 28 is connected to receive the output signal from the receiver 26 and converts the modulation level of the output carrier produced by the receiver 26 into an $n$ bit digital format indicative of that level. The conversion is controlled by a command signal placed on the command signal line 38 by an output instruction from the processing unit 30. Once having received the $n$ bit converter information from the various structure heretofore noted, the processing unit 30 processes the digital information according to the algorithm noted in equation (5) hereinabove and calculates the antenna pattern null angle $\theta_1$ with respect to antennae 10, 12 along axis A. Having calculated the first antenna pattern null angle $\theta_1$, the processing unit 30, again under program control, transmits command output signals to the converter 40 such that RF switch 22 is opened, thereby blocking any input signals received by antenna 12, and closes RF switch 24 so that signals received by antenna 14 are sent through switch 24 for further processing. At this time, signal information received at antennae 10 and 14 placed along axis B are processed in a manner identical to that described with reference to information processed with respect to antennae 10, 12. All three of the antennae 10, 12, 14 lie in a common plane and define a right triangle with antenna 10 being at the vertex of the right angle. Moreover, and for ease in programming and calculations, the antenna are separated by a predetermined wavelength distance $d$, which in the present embodiment has been chosen to be one quarter of the wavelength of the RF signal source being investigated.

The distances over which the antennae are separated may, in other embodiments, be altered to longer or shorter wavelengths smaller than that of one-half wavelengths. At one-half wavelength and greater, ambiguities are generated within the received antenna pattern null angles and resolution to a non-ambiguous solution is complex and difficult. Moreover, the three antennae, while shown in a triangular configuration having equal distances on two sides thereof, may be reconfigured in other right triangle variations with resultant inequalities in the wavelength separations but which inequalities, when programmed into the computer, will function equally well in the process for determining direction of angle. The antennae axes are positioned orthogonal to each other in order to further reduce DOA ambiguities and the final readout of the DOA angle $\alpha$ is an azimuth reading lying within the common plane defined by the orthogonal axes. Since the variable phase shifter 16 is connected to receive the incoming RF signal at only one of the three antenna elements, that antenna element is always positioned at the vertex of the right angle antennae configuration and therefore becomes the reference antenna common to both axes A, B. Once having determined the antenna pattern null angle $\theta_2$ corresponding to the RF signal received at antennae 10, 14 the processing unit 30 then calculates the direction of arrival angle $\alpha$ according to the algorithm shown in equation (6) hereinabove. When the direction of arrival angle is determined, the processing unit 30 provides an output signal to the CRT display 34 which displays the desired information in any convenient manner.

Figure 2:
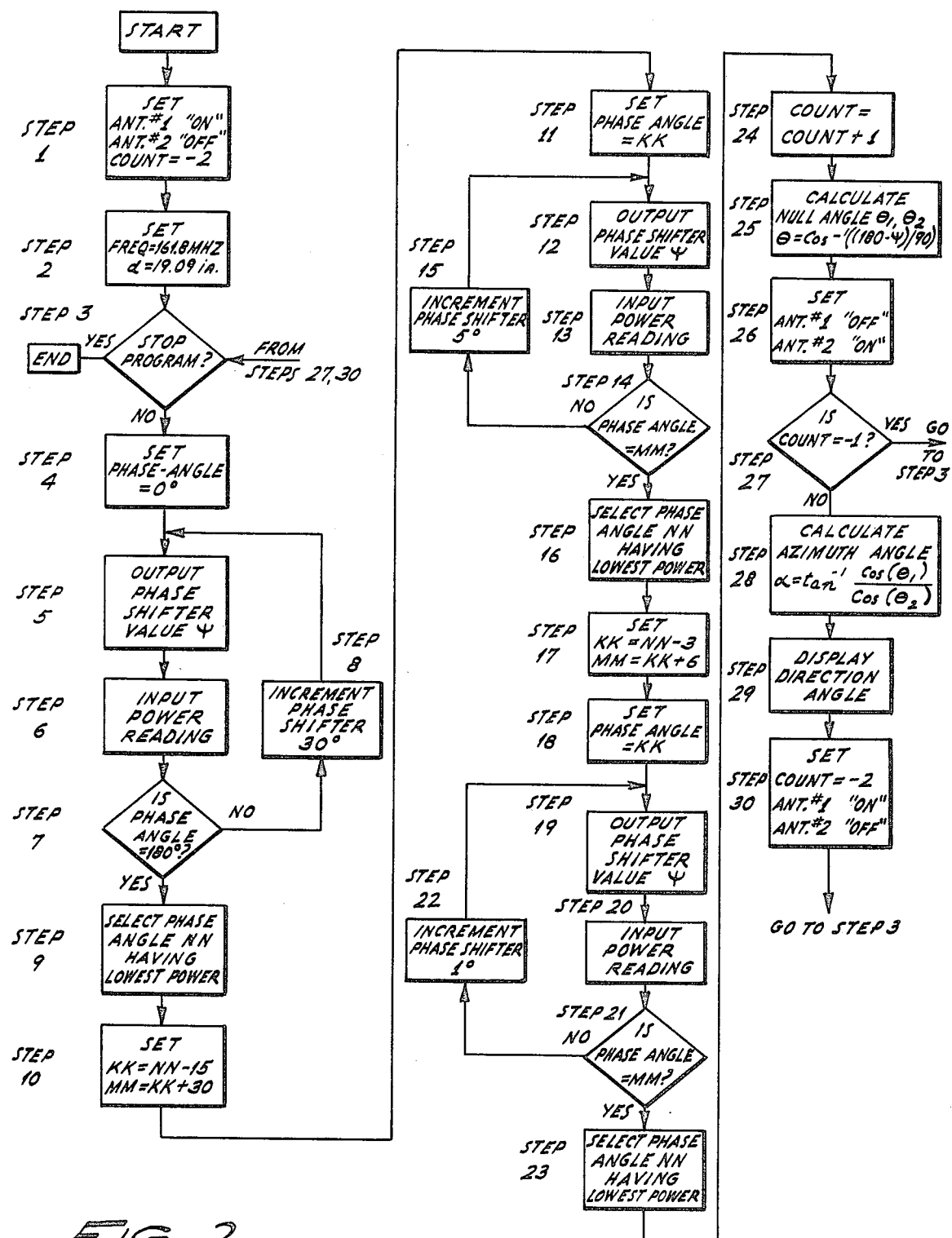
FIG. 2 is a flow chart of processing steps utilized within the processing unit of the invention shown in FIG. 1.

Having thus described the general operation of the present invention, the operation of the central processing unit will now be described in greater detail with respect to the flow chart illustrated in FIG. 2. Accordingly, step 1 of the flow chart calls for the setting of antenna No. 1 (antenna 12 shown in FIG. 1) to the "ON" position which, in actual operation, calls for the output of a control signal to the converter 40 such that RF switch 22 is turned on. Correspondingly, antenna No. 2 (antenna 14 shown in FIG. 1) is turned off such that, in actual operation, a command output signal is sent through the converter 40 so as to turn off RF switch 24. A counter provided in the conventional processing unit 30 is also set to the count of −2. Step 2 of the flow chart enters the center frequency of the RF signal of interest to be processed and also the wavelength spacing $d$ between the respective antennae elements. The examples used in the present embodiment are a frequency of 161.8 MHz. and a spacing $d$ of 19.09 inches. Step 3 of the program asks if a point has been reached at which it is desired to stop the program. If so, the program is ended and further calculations are ended. Initially, however, the program continues on to step 4 where the phase angle of the phase shifter 16 shown in FIG. 1 is set to 0°. Step 5 requires that the signal level at the determined phase shifter angle value $\psi$ be entered for further processing. Step 6 requires that the angle value produced at step 5 be processed along with the output level from RF switch 22 through the summer 20 and receiver 26 to the A/D converter 28. At this point in time the processing unit directs that a command signal be produced on output line 38 and sent to the converter 28 to initiate digital conversion. Step 7 inquires as to whether the phase angle initially selected in step 4 to be 0° is now 180°. If not, the flow chart continues to step 8 wherein the phase shifter 16 angle is incremented by 30° to the next value and steps 5, 6 and 7 are again repeated until the shifter 16 has been incremented through a total phase shift of 180°. Once having reached a total phase shift of 180°, the flow chart continues to step 9 where the processed information is selected as to the phase angle NN having the lowest power output or greatest signal null. At this point in time it is to be noted that in actual operation, the flow chart has called for a search of the antenna pattern produced along axis A between antenna 10, 12; 180° each side of axis A in 30° increments thereby covering an entire 360° angular area about the axis. Proceeding from step 9, step 10 requires new angular values KK, MM to be identified according to the equations noted. At this point in time, the antenna pattern angle $\theta$ has been identified with respect to the unknown RF signal source within a 30° half-angle sector or 60° full angle sector about the axis A. Step 10 initiates the new values KK, MM which define, respectively, the lower and upper limits of a new angular search to be performed within the previously determined phase angle NN. Essentially, step 10 determines that any resulting new phase angle NN shall be accurate within ± 15° of the calculated value. Step 11 sets the phase angle of the phase shifter 16 to a new phase angle defined as KK. Similar to step 4, step 11 calls for the output of a command signal from the processing unit 30 on output line 36 to the phase shifter 16 to cause the shifter 16 to shift to the desired angular value. Steps 12, 13, 14 and 15 are similar in operation to the previously detailed steps 5, 6, 7 and 8 with the difference being that the phase shifter will be incremented at 5° increments as noted in step 15 and the phase shifter will only be incremented to a maximum angle of MM as noted in step 14. Step 16 calls for the selection of that phase angle NN exhibiting the lowest power output. At this point in time, an antenna pattern angle $\theta$ has been selected with reference to axis A which is accurate to ± 5° of the value selected in step

16. Step 17, similar to the operation of step 10, determines the upper and lower limits of the angular sector to be searched within the newly calculated angle NN determined in step 16. Step 18, similar to step 11, sets the phase shifter to the calculated phase angle KK and steps 19, 20, 21 and 22, similar to steps 12, 13, 14 and 15 increment the phase shifter toward the upper limit phase angle MM with the difference being as shown in step 22 wherein the phase shifter is now changed according to 1° increments. Step 23 requires the selection of a new phase angle NN exhibiting the lowest power level output. At this point in time, the antenna pattern angle $\theta$ referenced with respect to axis A will have been determined within ± 1° of accuracy which, for most applications, is entirely acceptable. Step 24 requires that the count previously initiated in Step 1 be now incremented by one. Step 25 calculates the antenna pattern null angle $\theta_1$ according to equation (5) noted previously. At this point in time the null angle $\theta_1$ has been calculated with respect to the signal received at the antennae pair 10 and 12. Step 26 requires that antenna No. 1 now be shut off and antenna No. 2 now be turned on. This is in accordance with the operation of the invention hereinbefore described with respect to the switching of input signals from one antenna pair to the corresponding orthogonally oriented other antenna pair. In actual operation, therefore, antenna pair 10, 12 is made inoperative and antenna pair 10, 14 becomes active. Step 27 inquires as to the number in the count and at this point in the example, because of having gone through the calculation of only one of the null angles, the count is −1 and the flow chart returns to Step 3 to proceed with further steps that provide for the calculation of the second antenna pattern null angle $\theta_2$ with respect to antennae 10, 14 placed along axis B. Jumping ahead for the moment to Step 27 after the latter calculation, the count is reduced to zero and the instruction is to proceed to Step 28 where the DOA or azimuth angle $\alpha$ is calculated according to equation (6) noted previously. As an enhancement to the present invention, Step 29 is provided to direct the display of the azimuth angle $\alpha$ calculated in Step 28 which, in actual application, activates the CRT display 34 connected to receive the output from the processing unit 30. After display, Step 30 of the flow chart directs that the count to be reset to −2 and the appropriate antennae to reverted to their former activated positions such as formerly set forth in Step 1 with the further direction that a return be made to Step 3 or an inquiry is made as to the stopping of the program. At this point in time and having reached Step 3, it may be appropriate to end the program such as by inserting the appropriate data by way of teletype 32 into the processing unit 30 or, alternatively, the entire program may be recycled again according to the flow chart and a continuous update of information be obtained with respect to the position of the RF signal source thus providing a convenient method of tracking a signal source which is not fixed but rather moving along some unknown course.

After the processing of the pertinent information by the invention, it is to be noted that there is provided the azimuth of the unknown RF signal source with respect to the position of one axis the antenna configuration. By way of example only, the present invention calculates the DOA angle $\alpha$ which is referenced to axis A formed by antennae 10 and 12 and, alternatively, axis B may be selected by appropriate calculation changes. Relatively speaking, however, the entire triangular configuration appears only as a small reference point with regard to a signal source that may be miles away. The present invention may be coupled with other well known and conventional techniques presently employed to pinpoint the exact position of the signal source. Once such technique involves an On Top Position Indicator (OPTI) which operates in an air-to-sea situation on a fly-over technique utilizing a meter reading for providing a phase inversion and loss of signal level when the aircraft flies directly over the source of the signal located somewhere in the ocean. Coupled with the present invention, the aircraft may be quickly directed by way of the calculated azimuth direction to the source of the RF signal and on flying directly thereover, as assured by an accurate determination of the azimuth angle, the location of the source may be quickly determined.

Thus it may be seen that there has been provided a novel antennae system for adaptively determining the direction of arrival of a linearly polarized RF signal source.

Obviously, many modifications and variations of the invention are possible in light of the above teachings. It is therefore to be understood that within the scope of the appended claims, the invention may be practiced otherwise than as specifically described.

Appended hereto is a copy of a printout of a complete program for the operation of the central processing unit 30 of the present invention. Specifically, the program is designed to operate with a three antenna system configured in a right triangle formation with each of the remaining angles being 45° and is written in assembly and Fortran IV computer language. This program when entered into the Data General Corp. NOVA 1220 general purpose digital computer, for example, directs the operation of the computing machine in accordance with the invention and particularly with the form of the invention described above in connection with FIG. 2.

APPENDIX

ASSEMBLY PROGRAM

```
;       PROGRAM HAS TWO INTRY POINTS DIW AND DOSW.  THIS SUBROUNTINE
;       SHOULD BE USED WITH RTOS OR RDOS SYSTEMS ONLY !!!!
        .TITLE ADAPTIVE
        .ENT ADDCT
        .ENT DIW
        .ENT DOSW
        .ENT AOW
```

APPENDIX CONTINUED

```
          .EXTD  .FCALL,.FRET
          .EXTD  .BCDB      ;CONVERTS A NUMBER IN BCD TO BINARY
          .EXTD  .CPYL
          .EXTN  .UIEX
          .EXTU
          .NREL
.DUSR     GPI=76
ADDCT:    USDCT
USDCT:    DISAVE     ;INTERRUPT STATE SAVE AREA
          1B6        ;INTERRUPT MASK
          DINTS      ;INTERRUPT ROUTINE ADDRESS
ACTIV:    0          ;INTERRUPT ROUTINE FLAG
DVBCD:    0          ;BCD READ FROM DEVICE
DVBIN:    0          ;AND CONVETED TO BINARY
ERVAL:    0          ;RETURN STATUS
DISAVE:   .BLK 10    ;STATE SAVE AREA
;****************************************************
;DIGITAL INTERFACE EXTERNAL INTERRUPT HANDLER
;         AC2= DCT ADDRESS
;         AC3= RETURN ADDRESS FROM INTERRUPT
;****************************************************
DINTS:    STA 3,DISMISS   ;RETURN ADDRESS SAVED
          SUB 0,0         ;SET ROUTINE DONE
          STA 0,ACTIV     ; FLAG
          DIBC 1,GPI
          MOVR 1,1,SZC           ;IS DATA OUT-OF-RANGE??
          JMP ERR ;INPUT DATA
          DIAC 1,GPI      ;INPUT DATA AND
          STA 1,DVBCD     ;SAVE BCD DATA
          LDA 2,MSKD      ;MASK DATA TO CONVERT TO BINARY
          AND 2,1
          JSR@ .BCDB      ;CONVET TO BINARY
          STA 1,DVBIN     ;STORE IN SECOND VARIABLE
          SUBZL 2,2       ;GENERATE +1
          STA 2,ERVAL     ;STATUS=1
          LDA 3,DISMISS
          .UIEX
DISMISS:0
ERR:      SUB 1,1  ;GENERAT 0
          STA 1,ERVAL     ;STATUS=2
          LDA 3,DISMISS
          .UIEX
;****************************************************
;DIGITAL INTERFACE START ROUTINE
;
;CALLING SEQUENCE IN FORTRAN IV:
;
;         CALL DIW(I,J,IERR)
;WHERE
;         I=BCD DATA AS INPUTED TO GPI
;         J=BINARY OF INPUT DATA
;         IERR= 0 DATA READ IS OUT OF RANGE
;               1 DATA WAS READ
;****************************************************
          FS.
```

APPENDIX CONTINUED

```
DIW:    JSR@ .CPYL
        STA 3,FROLC         ;SAVE FSP
        SUBZL 0,0           ;SET ROUTINE BUZY
        STA 0,ACTIV         ;AND
        NIOS GPI            ;START DEVICE
        LDA 0,ACTIVE        ;IS DEVICE BUZY
        MOV 0,0 SZR         ;CHECK-
        JMP .-2             ;YES
        LDA 3,FROLC         ;NO-THEN RESTORE FSP
        LDA 0,DVBCD
        LDA 1,DVBIN
        LDA 2,ERVAL         ;NOW
        STA @0,TMP,3        ;RUTURN DATA
        STA@ 1,TMP+1,3
        STA@ 2,TMP+2,3
        JSR@ .FRET          ;RETURN TO MAIN PROG
FROLC:  0
.DUSR   FS.=4
;
;*********************************************************
;
;DITGITAL INTERFACE TO SET SWITCH 1 & 2
;
;CALLING SEQUENCE IN FORTRAN IV
;
;       CALL DOSW (SWITCH1,SWITCH2,IERR)
;WHERE
;       SWITCH1= TRUE / FALSE
;       SWITCH2= TRUE / FALSE
;       IERR = 0 DID NOT FINISH TASK
;            = 1 SWITCHES WERE SET
;*********************************************************
        FS1.
DOSW:   JSR@ .CPYL
        LDA@ 1,TMP,3        ;RECALL SWITCH 1
        MOVZL 1,1           ;SHIFT LEFT
        LDA@ 2,TMP+1,3      ;RECALL SWITCH @
        SUBZL 0,0           ;GENERATE +1 FOR MASK
        AND 0,2             ;MASK SWITCH 2 DATA
        ADD 1,2
        DOA 2,GPI           ;SET ANALOG SWITCHES
        SUBZL 2,2           ;GENERTE +1
        STA@ 2,TMP+2,3      ;SET M=1
        JSR@ .FRET          ;AND RETURN
        FS1.=4
        TMP=-167
MSKD:   17777   ;DATA MASK
;*********************************************************
;
;       ANALOG INTERFACE TO SET PHASE SHIFTER
;
;       CALLING SEQUENCE IN FORTRAN IV
;       CALL AOW (I,J,IERR)
;WHERE
;       I=DESIRED PHASE SETTING
```

APPENDIX CONTINUED

```
;         J= THE VOLTAGE SETTING USED BY RIUTINE
;         IERR= THE RETURN STATUS (Ø) ERROR AND (1) COMPLETED
;
;**********************************************************
         FS1.
AOW:     JSR@ .CPYL
         LDA@ 1,TMP,3        ;GET DESIRED PHASE
         LDA Ø,TBMAX         ;MAXIMUM PHASE SETTING
         SUBZ# Ø,1,SZC       ;IS PHASE OUT-OF-RANGE
         JMP ERR1            ;INPUT ERROR
         LDA  2,ATBLV        ;LOAD FIRST VOLTAGE TABLE LOC.
         ADD 1,2
         LDA 1,Ø,2           ;GET DESIRED VOLTAGE SETTING
         STA 1,VOLTS
         LDA 2,ZERO          ;SELECT CHANNEL ZERO
         DOB Ø,DACV          ;SET CHANNEL
         LDA Ø,VOLTS         ;SET PHASE SHIFTER
         DOA Ø,DACV
         STA@ Ø,TMP+1,3      ;TRANSFER VOLTAGE SETTING TO PROG.
         SUBZL Ø,Ø           ;STATUS= 1
         STA@ Ø,TMP+2,3
         JSR@ .FRET          ;RETURN TO MAIN PROGRAM
ERR1:    SUB Ø,Ø             ;STATUS= Ø
         STA@ Ø,TMP+2,3      ;FOR ERROR RETURN
         JSR@ .FRET          ;RETURN TO MAIN PROGRAM
VOLTS:   Ø                   ;THE EFFECTIVE VOLTAGE SETTING
ZERO:    Ø                   ;CHANNEL SELECTED TO BE ZERO
         .RDX 10
TBMAX:   18Ø                 ;MAXIMUM PHASE SETTING= 18Ø DEG.
ATBLV:   TBLV                ;STARTING ADDERSS OF TABLE
TBLV:    3Ø57                ;Ø      7.465
         3ØØ4                ;1      7.333
         2948                ;2      7.198
         2892                ;3      7.Ø6Ø
         2838                ;4      6.929
         2787                ;5      6.8Ø4
         2737                ;6
         2688                ;7
         264Ø                ;8
         2594                ;9
         2548                ;1Ø
         25Ø6                ;11
         2463                ;12
         2423                ;13
         2384
         2345                ;15
         23Ø9
         2272
         2238
         22Ø6
         2174                ;2Ø
         2142
         211Ø
         2Ø78
```

APPENDIX CONTINUED

```
2046
2018        ;25
1991
1963
1936
1910
1885        ;30
1859
1834
1810
1786
1761        ;35
1737
1714
1692
1669
1646        ;40
1624
1603
1582
1560
1539        ;45
1520
1501
1483
1464
1446        ;50
1428
1411
1393
1376
1359        ;55
1342
1326
1310
1295
1279
1264
1248
1233
1217
1201        ;65
1185
1170
1154
1138
1123        ;70
1109
1095
1081
1067
1053        ;75
1040
1026
```

APPENDIX CONTINUED

```
1015
1005
 994        ;80
 984
 973
 963
 952
 942        ;85
 931
 921
 909
 898
 886        ;90
 874
 863
 851
 839
 825        ;95
 817
 807
 797
 786
 776        ;100
 766
 756
 746
 736
 726
 716
 707
 698
 689
 680        ;110
 671
 662
 653
 644
 635        ;115
 626
 617
 608
 599
 591        ;120
 582
 574
 565
 557
 548
 540
 531
 523
 514
 506        ;130
 498
 490
```

APPENDIX CONTINUED

```
482
474
467
459
451
443
435
427        ;140
419
411
404
396
388        ;145
379
371
363
355
347        ;150
339
331
323
313
307        ;155
299
291
284
276
268        ;160
260
252
244
236
228        ;165
221
213
205
197
190        ;170
183
176
168
161
153        ;175
146
139
132
124
116
.END
14:36:12
R
```

MAIN PROGRAM

DIMENSION ANGLE (4)

APPENDIX CONTINUED

```
        INTEGER P1MAX, X2, Y2, X3, Y3
        EXTERNAL ADDCT
         LOGICAL SSW1, SSW2
         INTEGER POWER (0: 181), P2MAX, P3MAX
        CALL CHANG(41K)
         CALL FINTD(62, ADDCT)
        CALL ERASE
        ACCEPT "TYPE (2) FOR PRESENTATION, (1) TO BY-PASS.", I
        GO TO (600, 80), I
80      CALL STR(100, 100, "ADAPTIVE ARRAY TECHNOLOGY")
        CALL STR(180, 250, "USED FOR")
        CALL STR(90, 400, "RF SIGNAL DIRECTION FINDING")
        CALL WAIT(7, 2, IERR)
        CALL ERASE
        CALL STR(100, 100, "WHAT IS AN ADAPTIVE ARRAY ?")
        CALL WAIT (3, 2, IERR)
        CALL LINE (190, 395, 310, 395)
        CALL LINE (190, 391, 310, 391)
        CALL WAIT (7, 2, IERR)
        CALL ERASE
        CALL STR(100, 70, "MOST ADAPTIVE ARRAYS ARE RECIEVE SYST
       1EMS. ")
        CALL STR(100, 110, "ASSUME...")
        CALL WAIT (5, 2, IERR)
        CALL SIGNAL
        CALL JAM
        CALL PLANE
        CALL RAY1
        CALL RAY2
        CALL CIR(250, 250, 100)
        DO 1000 J=1, 5
        CALL EBOX1(290, 162, 510, 152)
        CALL WAIT (2, 2, IERR)
        CALL STR(290, 350, "NORMAL RECIEVE PATTERN")
1000    CALL WAIT(2, 2, IERR)
        CALL ERASE
        CALL STR(100, 70, "AN ADAPTIVE SYSTEM DOES THIS FOR YOU!")
        CALL SIGNAL
        CALL JAM
        CALL PLANE
        CALL CIR(250, 300, 50)
        CALL CIR(250, 200, 50)
        CALL STR(260, 350, "ADAPTIVE PATTERN")
        CALL WAIT(15, 2, IERR)
        CALL ERASE
        CALL STR(100, 170, "ADAPTATION IS DYNAMIC!")
        CALL STR(100, 210, "AND CHANGES ITS RECIEVE PATTERN FOR")
        CALL STR(100, 230, "A CHANGING ENVIRONMENT AS FOLLOWS:")
        CALL WAIT(10, 2, IERR)
        CALL ERASE
        CALL PATTERN(1)
600     COUNT=-2
        I=0
        SSW1=.TRUE.
        SSW2=.FALSE.
```

APPENDIX CONTINUED

```
       CALL ERASE
       CALL STR(125, 50, "DIRECTION-FINDING-ROUTINE")
       CALL STR(100, 140, "YOUR OPTION FOR DISPLAY IS AS FOLLOWS:")
       CALL STR(100, 160, "(1) DISPLAY POWER VS. PHASE SHIFT FOR
     1 EASH ANTENNA")
       CALL STR(100, 230, "** INPUT CORRECT NUMBER")
       CALL STR(100, 180, "(2) CONTINUOUS POINTER INDICATION")
       CALL STR(100, 210, "(3) END DOA ROUTINE")
       ACCEPT "ACCEPT =",INPUT
       FREQ=. 1618
       D=19. 09
       DR=FREQ*2. 54*180. *D/30.
       GO TO (60, 70, 500), INPUT
  60   CALL ERASE
       CALL STR(125, 20, "ANTENNA NO# 1 PHASE RESPONSE")
       CALL LINE(130, 450, 500, 450)
       CALL LINE(130, 450, 130, 150)
       CALL STR(470, 58, "180")
       CALL STR(300, 58, "90")
 400   CALL STR(60, 60," 0 DB")
       CALL STR(60, 160, "-10 DB")
       CALL STR(60, 260, "-20 DB")
  70   IF (SSW1. EQ. SSW2) GO TO 500
       CALL DOSW(SSW1, SSW2, IERR)
       DO 10 MPHI=0, 180, 30
       CALL AOW(MPHI, M, IERR)
       IF(IERR. LT. 1) GO TO 100
       CALL DIW(N, POWER(MPHI), IERR)
       MMHI=2*(MPHI+65)
       IF(INPUT. NE. 2. ) CALL STR(MMHI, 62+POWER(MPHI), "*")
  10   CONTINUE
       P1MAX=0
       DO 15 NN=0, 180, 30
       IF(P1MAX. LT. POWER(NN))KK=NN-15
       IF(P1MAX. LT. POWER(NN))P1MAX=POWER(NN)
  15   CONTINUE
       IF(KK. LT. 1)KK=0
       IF(180-KK. LT. 30) GO TO 1001
       MMM=KK+30
       GO TO 1002
1001   MMM=180
       KK=150
1002   DO 20 MPHI=KK, MMM, 5
       CALL AOW(MPHI, M, IERR)
       IF(IERR. LT. 1) GO TO 100
       IF(MPHI. EQ. KK)CALL DIW(N, DUM, IERR)
       CALL DIW(N, POWER(MPHI), IERR)
       MMHI=2*(MPHI+65)
       IF(INPUT. NE. 2. ) CALL DOT(MMHI, 450-POWER(MPHI))
  20   CONTINUE
       P2MAX=MAXO(POWER(KK),POWER(KK+5),POWER(KK+10),
     1POWER(KK+15), POWER(KK+20),POWER(KK+25),POWER(MMM))
       DO 25 NN=KK, MMM, 5
       IF(P2MAX. EQ. POWER(NN))GO TO 27
  25   CONTINUE
```

APPENDIX CONTINUED

```
27      KK=NN-3
        IF(KK. LT. 1)KK=0
        IF(180-KK. LT. 10)GO TO 1003
        JJJ=KK+6
        GO TO 1004
1003    JJJ=180
        KK=170
1004    DO 30 MPHI=KK, JJJ, 1
          CALL AOW(MPHI, M, IERR)
          IF(IERR. LT. 1)GO TO 100
        IF (MPHI.EQ.KK)CALL DIW(N, DUM, IERR)
          CALL DIW(N,POWER(MPHI), IERR)
          MMHI=2*(MPHI+65)
          IF(INPUT.NE. 2. ) CALL DOT(MMHI, 450-POWER(MPHI))
30      CONTINUE
        P3MAX=0
        DO 35 NN=KK, JJJ, 1
          IF(P3MAX. LT. POWER(NN))NPHI=NN
          IF(P3MAX. LT. POWER(NN))P3MAX=POWER(NN)
35      CONTINUE
        COUNT=COUNT+1
        TEM=(90-(FLOAT(NPHI)+90)/2)/DR
        D=TEM*TEM
        IF(D. GT. 1. 0) D=1.0
        X=SQRT(1-D)
        I=I+1
        ANGLE(I)=ATAN2(X, TEM)
        IF(INPUT. EQ. 2. ) GO TO 39
        TYPE "NPHI=",NPHI, "TEM=", TEM
        PAUSE
        CALL ERASE
        CALL STR(125, 20, "ANTENNA NO# 2 PHASE RESPONSE")
        CALL LINE(130, 450, 500, 450)
        CALL LINE(130, 450, 130, 150)
        CALL STR(470, 58, "180")
        CALL STR(300, 58, "90")
39      SSW1=. FALSE.
        SSW2=. TRUE.
        IF(COUNT)40, 50, 50
40      IF(INPUT. EQ. 2. ) GO TO 70
        GO TO 400
50       CALL ERASE
        CALL LINE(256, 446, 256, 16)
        CALL LINE(16, 256, 496, 256)
        A=COS(ANGLE(1))
        B=COS(ANGLE(2))
        AA=A*A+B*B
        IF(AA. GT. 1. 0) AA=1.0
        THEA=ACOS(SQRT(1-AA))
        PHI=ATAN2(COS(ANGLE(1)),COS(ANGLE(2)))
        X2=256+125*SIN(THEA)
        Y2=256+125*COS(THEA)
        Y3=256+125*SIN(PHI)
        X3=256+125*COS(PHI)
        CALL LINE(256, 256, X3, Y3)
```

APPENDIX CONTINUED

```
          CALL POINTS(PHI, X3, Y3, IAX, IAY, IBX, IBY)
          CALL TRI(IAX, IAY, IBX, IBY, X3, Y3)
          CALL STR(100, 35, "VECTOR INDICATES ANGLE IN AZIMUTH.")
          ANGLE(1)=ANGLE(1)*57.29578
          ANGLE(2)=ANGLE(2)*57.29578
          THEA=THEA*57.29578
          PHI=PHI*57.29578
          IT=PHI
          CALL STR(40, 100, "PHI= ")
          CALL NUM(-1, -1, IT)
          CALL STR(40, 115, "THEA= ")
          K=THEA
          CALL NUM(-1, -1, K)
          CALL PLANE(90)
          IF(INPUT. EQ. 2. ) GO TO 90
          TYPE "ANGLE(1) = ", ANGLE(1), "ANGLE(2) = ",ANGLE(2)
          TYPE "THEA=", THEA, "PHI=", PHI
          PAUSE
          CALL ERASE
          GO TO 600
90        COUNT=-2
          I=0
          SSW1=. TRUE.
          SSW2=. FALSE.
          GO TO 70
100          TYPE"     PHASE SHIFTER DID NOT WORK"
500       CALL ERASE
          END
```

What is claimed is:

1. An antennae system for adaptively determining the direction of arrival angle α of a signal source, comprising, in combination:

first, second and third antennae fixed in a right triangle configuration for receiving the signal source and for producing respective output signals indicative of said source:

phase shifting means having a first input connected to receive the output signal from the respective one of said antennae fixed at the right angle apex of said configuration and for producing a phase shifted output signal upon receipt of a control signal at a second input;

means connected to receive the phase shifted output signal, output signals from the respective others of said antennae and control signals for alternatingly summing said phase shifted output signal with selected ones of the other antenna output signals according to the receipt of said control signals and for producing summed output signals indicative thereof;

detecting means connected to receive the summed output signals for detecting the levels thereof and for producing an output indicative of said levels; and processing means connected to provide said control signals to said phase shifting means second input and to said summing means and connected to receive the detecting means output for calculating the antenna pattern null angles θ of orthogonal pairs of said antennae according to the equation $$\theta = \cos^{-1}\frac{180 - \psi}{90}$$

wherein $\psi$ = the phase angle of the summed output signals having the lowest output level and the antennae in each of said pairs are separated by one quarter wavelength, and for producing the direction of arrival angle of the signal source according to the equation $$\alpha = \tan^{-1}\frac{\cos\theta_1}{\cos\theta_2}$$

wherein $\theta_1$ = the null angle of one orthogonal antenna pair and $\theta_2$ = the null angle of the other orthogonal antennae pair.

2. An antennae system according to claim 1 further comprising means connected to receive the calculated value of the direction of arrival angle from said processing means for displaying said value on a visual display.

3. An antennae system according to claim 1 wherein said phase shifting means further comprises:

a variable phase shifter having a first input connected to receive the output signal from said respective one of said antennae and a second input connected to receive said control signal from said processing means for selectively varying the phase shift of the antenna output signal in accordance with said control signal and for producing an output thereof; and a variable attenuator connected to receive said variable phase shifter output for selectively attenuating said output and for producing said phase shifting means output signal.

4. An antennae system according to claim 3 wherein said summing means further comprises:

switching means connected to receive the output signals from said respective others of said antennae and operatively connected to receive said control signals from said processing means for alternatingly passing the other antennae output signals upon receipt of said control signals and for producing first and second output signals indicative thereof; and a summer connected to receive the phase shifted output signal and said switching means output signals of producing said summing means output signals.

5. An antennae system according to claim 4 wherein said switching means further comprises:

a first switch having a first input connected to receive the output signal from one of said respective others of said antennae for producing said switching means first output signal upon the receipt of one of said control signals at a second input; and a second switch having a first input connected to receive the output signal from the other of said respective others of said antennae for producing said switching means second output signal upon the receipt of another of said control signals at a second input.

6. An antennae system according to claim 5 wherein said detecting means is a broadband RF receiver.

7. An antennae system according to claim 6 wherein said RF receiver detects the amplitude modulation levels of said summed output signals.

8. A method for calculating the direction of arrival angle $\alpha$ of an RF signal source comprising the steps of:

placing three antennae in a right triangle configuration having two orthogonal pairs of antennae with a spacing of one quarter wavelength between respective antennae forming each of said pairs;

incrementally shifting the phase angle of the signal received by the antenna placed at the apex of the right triangle;

summing the shifted phase angle signal with only the received signal from the remaining antenna is one of the orthogonal pairs;

selecting the phase angle $\psi_1$ of the summed signal having the lowest energy level;

calculating a first antenna pattern null angle $\theta_1$ according to the equation $$\theta_1 = \cos^{-1}\frac{180 - \psi_1}{90};$$

summing the shifted phase angle signal with only the received signal from the remaining antenna in the other of the orthogonal pairs;

selecting the phase angle $\psi_2$ of the summed signal having the lowest energy level;

calculating a second antenna pattern null angle $\theta_2$ according to the equation $$\theta_2 = \cos^{-1}\frac{180 - \psi_2}{90}; \text{ and}$$

calculating the direction of arrival angle according to the equation $$\alpha = \tan^{-1}\frac{\cos \theta_1}{\cos \theta_2}.$$

9. A method according to claim 8 wherein the steps of selecting further comprise:

detecting the respective modulation levels of said summed signals, said modulation levels being indicative of the respective energies of said signals.

10. A method according to claim 8 further comprising the step of:

displaying the direction of arrival angle $\alpha$.

* * * * *